United States Patent
Ahn et al.

(10) Patent No.: US 10,142,057 B2
(45) Date of Patent: Nov. 27, 2018

(54) METHOD AND DEVICE FOR RECEIVING DATA

(71) Applicant: LG Electronics Inc., Seoul (KR)

(72) Inventors: Joonkui Ahn, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/501,617

(22) PCT Filed: Jul. 30, 2015

(86) PCT No.: PCT/KR2015/007975
§ 371 (c)(1),
(2) Date: Feb. 3, 2017

(87) PCT Pub. No.: WO2016/021873
PCT Pub. Date: Feb. 11, 2016

(65) Prior Publication Data
US 2017/0237524 A1    Aug. 17, 2017

Related U.S. Application Data

(60) Provisional application No. 62/032,641, filed on Aug. 4, 2014.

(51) Int. Cl.
*H04L 1/00* (2006.01)
*H04L 1/16* (2006.01)
*H04L 1/18* (2006.01)
*H04L 27/38* (2006.01)
*H04L 27/00* (2006.01)

(52) U.S. Cl.
CPC .......... *H04L 1/0045* (2013.01); *H04L 1/1607* (2013.01); *H04L 1/1835* (2013.01); *H04L 27/0008* (2013.01); *H04L 27/38* (2013.01)

(58) Field of Classification Search
CPC ..................................................... H04L 1/0061
USPC ......................................... 714/799, 793, 798
See application file for complete search history.

(56) References Cited

U.S. PATENT DOCUMENTS 7,606,575 B2 * 10/2009 Mahany ................. G06F 1/163
                                                              455/452.2
2010/0166111 A1 *  7/2010 Park ...................... H04L 1/0068
                                                              375/298

(Continued)

FOREIGN PATENT DOCUMENTS

KR    1020130039700    4/2013

OTHER PUBLICATIONS

3GPP TS 36.213, v11.6.0, section 7.1.8, Release 11, Mar. 2014, p. 53.

(Continued)

*Primary Examiner* — Fritz Alphonse
(74) *Attorney, Agent, or Firm* — Dentons US LLP

(57) ABSTRACT

Provided are a method for receiving data in a wireless communication system and a device using same. A device receives a code block from one cell among configured multiple cells. If a decoding error of the code block is detected, the device stores a part of or all of the code block in a receiver buffer. The number of coded bits of the code block stored in the receiver buffer is determined on the basis of the maximum modulation order supported by the cell from which the code block is received.

9 Claims, 4 Drawing Sheets

(56) References Cited

U.S. PATENT DOCUMENTS

2011/0246840 A1* 10/2011 Khoshnevis .......... H04L 1/0073
714/712
2012/0192042 A1* 7/2012 Buckley ................ H04L 1/0054
714/795

OTHER PUBLICATIONS

3GPP TS 36.212, v11.4.0, section 5.1.4.1.2, Release 11, Dec. 2013, pp. 17-18.
Ericsson, "On 256QAM UE category handling," R1-140756, 3GPP TSG RAN WG1 Meeting #76, Prague, Czech Republic, Feb. 1, 2014, see p. 2.
Blackberry UK Limited, "On UE category/capability handling to support 256 QAM," R1-142354, 3GPP TSG RAN WG1 Meeting #77, Seoul, Korea, May 10, 2014, see pp. 1-5.
Huawei, Hisilicon, "Discussion on UE category with introduction of 256QAM," R1-140036, 3GPP TSG RAN WG1 Meeting #76, Prague, Czech Republic, Feb. 1, 2014, see pp. 1-3.
Ericsson, "On 256QAM UE category handling," R1-141638, 3GPP TSG RAN WG1 Meeting #76bis, Shenzhen, China, Mar. 22, 2014, see pp. 1-4.
3GPP TS 3.212, v11.4.0, section 5.1.4.1.2, Release 11, Dec. 2013, pp. 17-18.
3GPP TS 36.212, v11.4.0, section 7.1.8, Release 11, Mar. 2014, p. 53.

* cited by examiner

METHOD AND DEVICE FOR RECEIVING DATA

CROSS-REFERENCE TO RELATED APPLICATIONS

This application is the National Stage filing under 35 U.S.C. 371 of International Application No. PCT/KR2015/007975, filed on Jul. 30, 2015, which claims the benefit of U.S. Provisional Application No. 62/032,641 filed on Aug. 4, 2014, the contents of which are all hereby incorporated by reference herein in their entirety.

BACKGROUND OF THE INVENTION

Field of the Invention

The present invention relates to wireless communication, and more particularly, to a method of receiving data in a wireless communication system to which a plurality of cells are configured, and a device using the method.

Related Art

A data traffic usage amount is rapidly being increased together with the development of a mobile technology. A standardization task and a technology development are underway in several fields to handle a faster and greater amount of data traffic by using a limited radio resource. A representative example thereof may include 3D beam forming, massive multiple input multiple output (MIMO), a heterogeneous network, a small cell, or the like.

With the development of a communication system, various capabilities are introduced such as a modulation order (e.g., 64-quadrature amplitude modulation (QAM), etc.) supportable for each terminal, the number of supportable layers, the number of supportable serving cells, or the like. Accordingly, a combination of capabilities to be delivered by the terminal to a network is increased, and thus an operation based on each capability combination becomes various.

Provided are a method of delivering information regarding the various capabilities and an operation of a terminal based thereon.

SUMMARY OF THE INVENTION

The present invention provides a method for receiving data in a wireless communication system in which a plurality of cells are configured and a device using the same.

In an aspect, a method for receiving data in a wireless communication system includes receiving, by a wireless device, a code block from one cell among a plurality of configured cells, and upon detecting a decoding error of the code block, storing, by the wireless device, a part or all of the code block in a reception buffer. The number of coded bits of the code block stored in the reception buffer may be determined based on a maximum modulation order supported by the cell from which the code block is received.

The plurality of configured cells may comprise at least one high order cell supporting a modulation order higher than a reference modulation order and at least one low order cell supporting a modulation order lower than or equal to the reference modulation order.

The cell from which the code block is received may be the high order cell.

The number of coded bits of the code block may be determined based a maximum modulation order supported by the cell from which the code block is received and the number of at least one high order cell.

In another aspect, a device for receiving data in a wireless communication system includes a radio frequency (RF) unit configured to transmit and receive a radio signal, and a processor operatively coupled to the RF unit. The processor is configured to receive a code block from one cell among a plurality of configured cells, and upon detecting a decoding error of the code block, store a part or all of the code block in a reception buffer. The number of coded bits of the code block stored in the reception buffer may be determined based on a maximum modulation order supported by the cell from which the code block is received.

Information regarding various capabilities of a wireless device may be reported to a base station. The wireless device to which a plurality of cells are configured may effectively manage a reception buffer.

DESCRIPTION OF EXEMPLARY EMBODIMENTS

Figure 1:
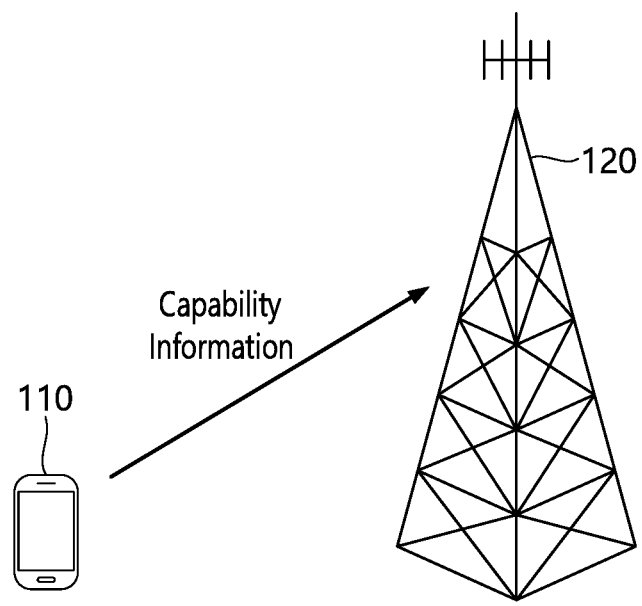
FIG. 1 shows a wireless communication system for implementing an embodiment of the present invention.

FIG. 1 shows a wireless communication system for implementing an embodiment of the present invention.

A wireless device 110 may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device 110 may be a device supporting a data communication such as a machine-type communication (MTC) device.

A base station (BS) 120 is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP Technical Specification (TS). This is for exemplary purposes only, and the present invention is also applicable to various wireless communication systems.

A subframe is a unit for scheduling in 3GPP LTE. One subframe may have a length of 1 millisecond (ms), which is called as a transmission time interval (TTI). A radio frame includes 10 subframes and one subframe includes 2 consecutive slots. A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc. In 3GPP LTE, in case of a normal cyclic prefix (CP), one subframe includes 14

OFDM symbols, and in case of an extended CP, one subframe includes 12 OFDM symbols.

A wireless device may be served by a plurality of serving cells under carrier aggregation (CA) or a dual connectivity. Each serving cell may be defined by one downlink (DL) component carrier (CC) or a pair of a DL CC and an uplink (UL) CC.

A serving cell may be classified into a primary cell and a secondary cell. The primary cell is a cell which operates at a primary frequency, performs an initial connection establishment procedure, starts a connection reestablishment procedure, or is designated as a primary cell in a handover procedure. The primary cell refers to a reference cell. The secondary cell may operate at a secondary frequency, may be configured after a Radio Resource Control (RRC) connection is established, and may be used to provide additional radio resources. Substantially, at least one primary cell may be configured, and the secondary cell may be added/modified/released according to higher layer signaling (e.g., radio resource control (RRC)). A cell index (CI) of the primary cell may be fixed. For example, the lowest CI may be designated as the CI of the primary cell. Hereinafter, a CI of the primary cell is 0, and a CI of the secondary cell is sequentially allocated from 1.

The wireless device 110 provides capability information to the BS 120. In 3GPP LTE, capability of the wireless device is classified into categories.

The following table shows a category for a DL capability of the wireless device in 3GPP LTE.

TABLE 1

| category | maximum number of bits of a DL transport block bits received within a TTI | total number of soft channel bits | maximum number of supported layers for spatial multiplexing |
|---|---|---|---|
| category 1 | 10296 | 250368 | 1 |
| category 2 | 51024 | 1237248 | 2 |
| category 3 | 75376 | 1237248 | 2 |
| category 4 | 75376 | 1827072 | 2 |
| category 5 | 149776 | 3667200 | 4 |
| category 6 | 149776 (4layers), 75376 (2layers) | 3654144 | 2 or 4 |
| category 7 | 149776 (4layers), 75376 (2layers) | 3654144 | 2 or 4 |
| category 8 | 299856 | 3598270 | 8 |
| category 9 | 149776 (4layers), 75376 (2layers) | 5481216 | 2 or 4 |
| category 10 | 149776 (4layers), 75376 (2layers) | 5481216 | 2 or 4 |

The following table shows a category for a UL capability of the wireless device in 3GPP LTE.

TABLE 2

| Category | maximum number of bits of a UL transport block bits transmitted within a TTI | Support for 64-QAM in UL |
|---|---|---|
| category 1 | 5160 | No |
| category 2 | 25456 | No |
| category 3 | 51024 | No |
| category 4 | 51024 | No |
| category 5 | 75376 | Yes |
| category 6 | 51024 | No |
| category 7 | 102048 | No |
| category 8 | 1497760 | Yes |
| category 9 | 51024 | No |
| category 10 | 102048 | No |

3GPP LTE, the wireless device provides signaling for each band on a band combination supporting 'the maximum number of layers supported for spatial multiplexing'. For example, it is assumed that the wireless device supports a band A and a band B. The wireless device may provide signaling to indicate that each of the band A and the band B supports four layers. Alternatively, in a CA environment in which the band A and the band B are combined, the wireless device may provide signaling to indicate that four layers are supported for the band A and two layers are supported for the band B.

It is assumed that Z denotes the maximum number of bits on which the wireless device can perform DL processing for one layer in one band. When it is said that the wireless device is capable of processing up to 4Z bits, it manes that up to four layers are supported for the band A. If it is said that the wireless device is capable of processing up to 6Z bits, it means that, even if up to four layers are supported for one band A, for a combination of two bands, 4Z+2Z bits may be used to support four layers on the band A and two layers on the band B.

Meanwhile, at present, 3GPP LTE supports up to 64-QAM (a modulation order 6). If 256-QAM or a modulation scheme having an order higher than that is introduced, the maximum number of bits to be supported may vary for the same number of layers.

For example, if processing of Z bits is required for one layer with respect to 64-QAM, processing of 4Z/3 bits is required for 245-QAM. For example, a wireless device capable of processing up to 4Z bits is capable of processing up to two layers for each band by using 2Z+2Z bits in a combination of the band A and the band B with respect to 64-QAM. However, the number of bits that can be processed for each band is changed to 4×2×Z/3+4×2×Z/3 with respect to 256-QAM.

In this case, if a combination of a modulation order (MO) capability and a multiple input multiple output (MIMO) capability is signaled by being defined for each band combination, excessively many signaling combinations may lead to an increase in a signaling overhead. Further, since a wireless device having various capabilities may exist in one cell, complexity of a network operation may be increased.

In one embodiment, for a band and/or band combination supporting a particular maximum MO capability, the wireless device may support a maximum MO capability to be supported and the number of processing bits corresponding to the maximum MO capability. That is, if the wireless device supports '256-QAM/4-layer+256-QAM/2-layer' for 'band A+band B', it may be regarded that '4×4×Z/3+4×2×Z/3' bits are supported.

In another embodiment, the wireless device may provide the BS with the maximum number of processing bits capable of supporting a maximum MO capability (e.g., the number of QAM symbols or the number of resource elements (REs) per layer) and/or a maximum full band (e.g., the number of resource blocks (RBs) or the number of CCs). Alternatively, the capability may be defined statically for a device category. For example, if the wireless device provides signaling to indicate that up to Y 256-QAM symbols can be supported, a network may adjust the number of 256-QAM symbols scheduled in one subframe not to exceed Y according to a MIMO layer and modulation order configured to the wireless device.

Now, a method of adjusting a size of a soft buffer allocated to a wireless device is proposed.

Figure 2:
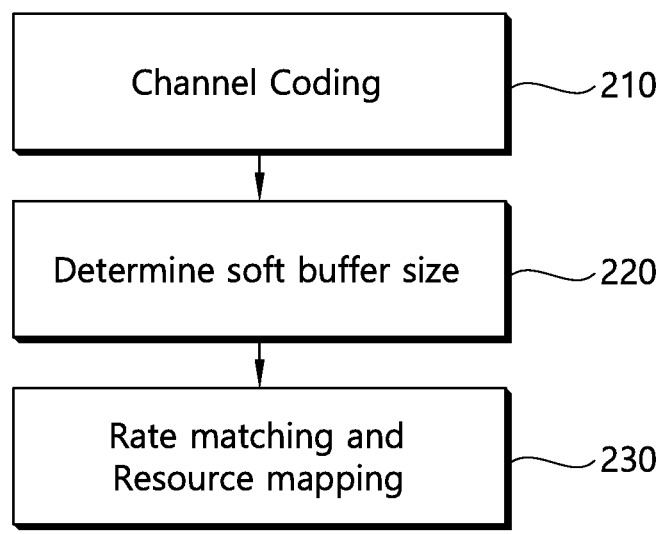
FIG. 2 is a flowchart showing a method of transmitting downlink (DL) data according to an embodiment of the present invention.

FIG. 2 is a flowchart showing a method of transmitting DL data according to an embodiment of the present invention.

First, a BS encodes an input information bit (210). Although there is no restriction on a channel coding scheme, well-known turbo coding may be applied.

The BS determines a soft buffer size for a corresponding wireless device (220). A reason for the BS to determine the soft buffer size for rate matching is to avoid a mismatch occurring when the number of soft bits used to determine a DL channel exceeds a maximum soft buffer size of a receiver and to effectively manage a redundancy bit of a hybrid automatic repeat request (HARQ) operation.

The BS performs rate matching according to the determined soft buffer size, and maps a rate-matched coded transport block to a resource (230), so as to be transmitted to the wireless device.

According to the section 5.1.4.1.2 of 3GPP TS 36.212 V11.4.0 (2013-12), a soft buffer size $N_{IR}$ is determined as follows.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 1]}$$

Herein, $N_{soft}$ is the total number of soft channel bits of Table 1, $K_{MIMO}$ is a parameter which varies depending on whether MIMO transmission is achieved, $M_{DL\_HARQ}$ is the maximum number of DL HARQ processes, and $M_{limit}$ is a constant.

$K_C$ may be set according to the targeted number of cells. For example, in case of a category of a device not supporting CA (e.g., categories 1 to 5), it is set to $K_C=1$. If a category (e.g., categories 6 and 7) of a device supporting two cells supports up to two layers, it is set to $K_C=2$. This means that a maximum soft buffer size is determined for each cell under the assumption that a total bit buffering decoding capability of the device is used by being divided by the two cells. When the device supports up to four layers even if it supports two cells, it is assumed that $K_C=1$ is set to support a sufficient code rate for each cell, and a corresponding bit processing capability is properly shared between different cells.

According to Table 1, the wireless device corresponding to the category 6 or 7 supports $N_{soft}$=3654144 bits, and a maximum transport block size (TBS) supportable in one layer of one cell is 75376 bits. Therefore, the number of HARQ-coded bits supported for a 75376-bit transport block (TB) in one cell is $N_{IR}$=3654144/(2×2×8)=114192, and a code rate supported in this case is approximately 0.66. However, this is a result obtained by assuming 64-QAM. A maximum TBS to be supported for each layer by the wireless device supporting 256-QAM is approximately 100000 bits equivalent to 4/3 of 75376 bits. In this case, a code rate is approximately 0.87, which results in a decrease in the number $N_{IR}$ of supportable bits.

To support a higher modulation order, the wireless device supporting 256-QAM may set $K_C$ to a value less than 2 (e.g., $K_C=1$). Alternatively, if 256-QAM is configured, a wireless device having a category (e.g., category 6, 7, 9, 10) in which a code rate supported for each cell is excessively small may set $K_C$ to a value less than 2 (e.g., $K_C=1$). A plurality of cells may be configured to the wireless device, and $K_C$ may be set to a value less than 2 (e.g., $K_C=1$) only for a cell supporting 256-QAM among the cells.

$N_{IR}$ of a cell supporting 256-QAM may be adjusted to be greater than $N_{IR}$ of a cell supporting a modulation order lower than 256-QAM.

Figure 3:
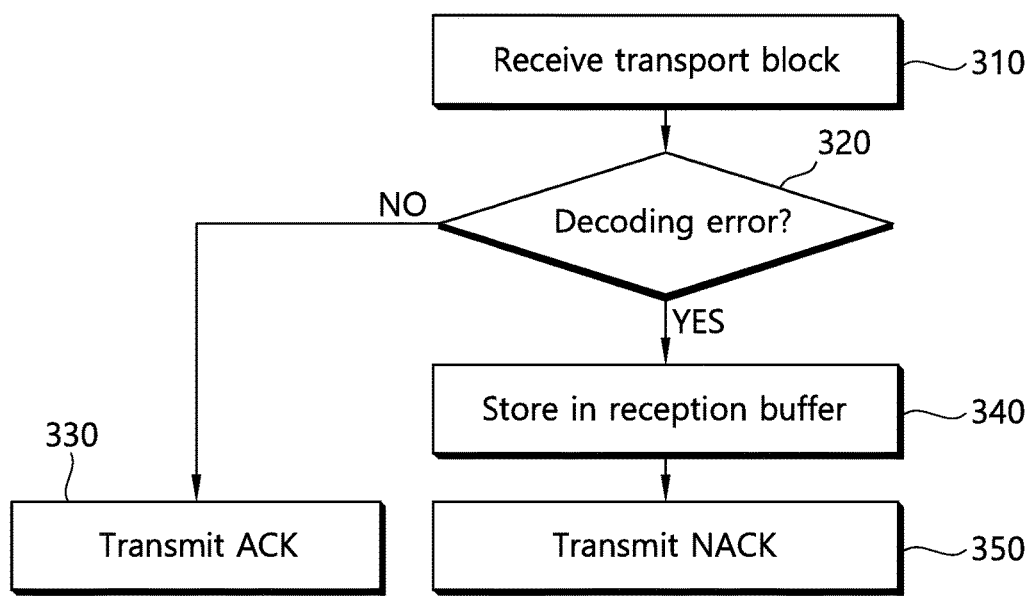
FIG. 3 is a flowchart showing a method of receiving DL data according to an embodiment of the present invention.

FIG. 3 is a flowchart showing a method of receiving DL data according to an embodiment of the present invention. This may be an example of performing DL HARQ by a wireless device. A plurality of cells may be configured to the wireless device.

The wireless device receives a code block of a transport block from one of a plurality of serving cells on a DL data channel (310). The wireless device attempts decoding of the received code block, and determines whether an error occurs (320). If the decoding is successful, the wireless device transmits ACK to a BS (330). If the decoding fails, the wireless device stores some or all parts of the code block in a reception buffer (340). In addition, the wireless device requests for retransmission by transmitting NACK for reporting the decoding failure (350).

According to the section 7.1.8 of 3GPP TS 36.213 V11.6.0 (2014-03), for each serving cell, a size $n_{SB}$ of a channel bit to be stored in the reception buffer is determined as follows.

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor \right) \quad \text{[Equation 2]}$$

Herein, C is the number of code blocks for the transport block, $N^{DL}_{cells}$ is the number of cells configured to the wireless device, and Ncb is the number of coded bits of a corresponding code block. $K_{MIMO}$, $N_{soft}$, $M_{DL\_HARQ}$, and $M_{limit}$ are defined in Table 1.

The plurality of cells configured to the wireless device may support various modulation orders. Among the plurality of cells, a cell supporting a modulation order higher than a reference modulation order is called a high order cell, and a cell supporting a modulation order lower than the reference modulation order is called a low order cell. For example, it is assumed that the reference modulation order is 6. A cell supporting a modulation scheme lower than up to 64-QAM is the low order cell, and a cell supporting up to 256-QAM is the high order cell.

Since the maximum number of coded bits may be relatively greater in a coded bit received in the high order cell in comparison with that of the lower order cell, it is proposed to provide a larger reception buffer in the high order cell. More specifically, this can be implemented by the following equation.

$$n'_{SB} = \min\left(N_{cb}, \left\lfloor \frac{Q \cdot N_{soft}}{C \cdot N_{cells}^{DL} \cdot K_{MIMO} \cdot \min(M_{DL\_HARQ}, M_{limit})} \right\rfloor \right) \quad \text{[Equation 3]}$$

Herein, Q is a parameter considering a modulation scheme supported by a corresponding cell. Q may be a value which varies depending on a maximum modulation order at which a corresponding cell is supported. Q may be increased when a higher modulation order is supported. Alternatively, Q of the low order cell is lower than Q of the high order cell.

In case of the high order cell, Q may be defined as follows.

$$Q = \frac{\frac{m_h}{m_l} N_h}{\frac{m_h}{m_l} N_h + N_l} \quad \text{[Equation 4]}$$

In case of the low order cell, Q may be defined as follows.

$$Q = \frac{N_l}{\frac{m_h}{m_l}N_h + N_l} \quad \text{[Equation 5]}$$

Herein, $m_h$ is a maximum modulation order supported by the high order cell, $m_l$ is a maximum modulation order supported by the low order cell, $N_h$ is the number of high order cells, and $N_l$ is the number of low order cells.

As shown in Table 1 and Table 2, in 3GPP LTE, a DL capability and a UL capability are exhibited at one time by using one category. For example, categories 6 and 7 exhibit the same DL capability, but exhibit a different UL capability. However, with the introduction of various UL capabilities such as the number of configurable cells, a configurable UL modulation order, the number of configurable UL MIMO layers, or the like, types of UL capabilities which may correspond to one DL capability may be increased in number. As a result, excessively many new categories are defined, which may cause an increased complexity.

Accordingly, it is proposed to restrict a combination of the DL category and UL category that can be signaled by the wireless device in such a manner that the category of the wireless device is signaled by distinguishing the DL capability and the UL capability.

The DL category may be limited to a category supporting DL MIMO layers of which the number is greater than or equal to the maximum number of UL MIMO layers that can be supported in the UL category.

The DL category may be limited to a category supporting a DL TBS greater than or equal to a maximum UL TBS that can be supported in the UL category.

It may be considered that the wireless device supporting the existing UL category supports a DL capability (e.g., greater than or equal to a TBS and the number of MIMO factors) greater than or equal to a DL category corresponding to the UL category. The considered DL capability may be supported even if it exceeds a capability of the DL category provided by the wireless device.

It may be considered that the wireless device supporting the existing DL category supports a UL capability (e.g., greater than or equal to a TBS and the number of MIMO factors) greater than or equal to a UL category corresponding to the DL category. The considered UL capability may be supported even if it exceeds a capability of the UL category provided by the wireless device.

Figure 4:
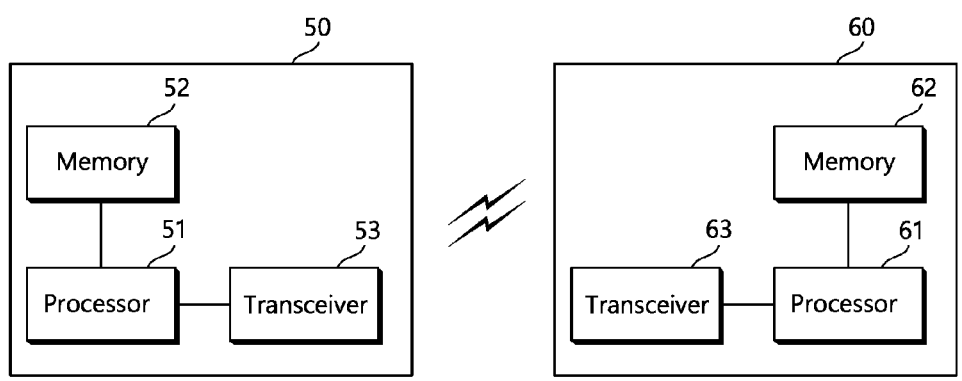
FIG. 4 is a block diagram showing a wireless communication system for implementing an embodiment of the present invention.

FIG. 4 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving data in a wireless communication system, the method comprising:
   receiving, by a wireless device, a code block from one cell among a plurality of configured cells; and
   upon detecting a decoding error of the code block, storing, by the wireless device, a part or all of the code block wherein the number of coded bits of the code block stored in the reception buffer is determined based on a maximum modulation order supported by the cell from which the code block is received, and
   wherein the plurality of configured cells comprise at least one high order cell supporting a modulation order higher than a reference modulation order and at least one low order cell supporting a modulation order lower than or equal to the reference modulation order.

2. The method of claim 1, wherein the cell from which the code block is received is the high order cell.

3. The method of claim 2, wherein the number of coded bits of the code block is determined based on a maximum modulation order supported by the cell from which the code block is received and the number of at least one high order cell.

4. The method of claim 1, wherein the reference modulation order is 6.

5. The method of claim 1, further comprising:
   transmitting a NACK for reporting the decoding error of the code block.

6. The method of claim 1, further comprising: if a decoding error of the code block is not detected, transmitting, by the wireless device, an ACK.

7. A device for receiving data in a wireless communication system, the device comprising:
   a transceiver; and
   a processor, operatively coupled to the transceiver, that:
   controls the transceiver to receive a code block from one cell among a plurality of configured cells; and
   upon detecting a decoding error of the code block, stores a part or all of the code block in a reception buffer, wherein the number of coded bits of the code block stored in the reception buffer is determined based on a maximum modulation order supported by the cell from which the code block is received, and wherein the plurality of configured cells comprise at least one high order cell supporting a modulation order higher than a reference modulation order and at least one low order cell supporting a modulation order lower than or equal to the reference modulation order.

8. The device of claim 7, wherein the cell from which the code block is received is the high order cell.

9. The device of claim 8, wherein the number of coded bits of the code block is determined based on a maximum modulation order supported by the cell from which the code block is received and the number of at least one high order cell.

* * * * *